(12) United States Patent
Bok et al.

(10) Patent No.: US 8,306,900 B2
(45) Date of Patent: Nov. 6, 2012

(54) SYSTEM, METHOD, AND COMPUTER PROGRAM PRODUCT FOR EXECUTING A BUY OR SELL ORDER

(75) Inventors: Tomas Bok, Concord, MA (US); David Cushing, Lexington, MA (US)

(73) Assignee: ITG Software Solutions, Inc., Culver City, CA (US)

( * ) Notice: Subject to any disclaimer, the term of this patent is extended or adjusted under 35 U.S.C. 154(b) by 1771 days.

(21) Appl. No.: 10/457,479

(22) Filed: Jun. 10, 2003

(65) Prior Publication Data

US 2004/0254874 A1 Dec. 16, 2004

(51) Int. Cl.
*G06Q 40/00* (2012.01)
(52) U.S. Cl. .......................................................... 705/37
(58) Field of Classification Search ................. 705/36 R, 705/37
See application file for complete search history.

(56) References Cited

U.S. PATENT DOCUMENTS

| | | | |
|---|---|---|---|
| 5,689,652 A * | 11/1997 | Lupien et al. .................... | 705/37 |
| 5,845,266 A | 12/1998 | Lupien et al. | |
| 5,873,071 A * | 2/1999 | Ferstenberg et al. ....... | 705/36 R |
| 5,950,177 A | 9/1999 | Lupien et al. | |
| 7,058,601 B1 | 6/2006 | Paiz | |
| 7,080,029 B1 | 7/2006 | Fallside et al. | |
| 7,171,385 B1 * | 1/2007 | Dembo et al. ............. | 705/36 R |
| 7,181,425 B1 * | 2/2007 | Cha ................... | 705/37 |
| 2001/0042010 A1 | 11/2001 | Hassell | |
| 2001/0044770 A1 | 11/2001 | Keith | |
| 2001/0051909 A1 | 12/2001 | Keith | |
| 2002/0004776 A1 * | 1/2002 | Gladstone ........................ | 705/37 |
| 2002/0013753 A1 | 1/2002 | Marks de Chabris et al. | |
| 2002/0019795 A1 | 2/2002 | Madoff et al. | |
| 2002/0035500 A1 * | 3/2002 | Yoko et al. ......................... | 705/9 |
| 2002/0052824 A1 * | 5/2002 | Mahanti et al. ................. | 705/37 |
| 2002/0065767 A1 * | 5/2002 | Manabe et al. ................. | 705/37 |
| 2002/0072957 A1 * | 6/2002 | Thompson et al. ............. | 705/10 |
| 2002/0133424 A1 * | 9/2002 | Joao ................................. | 705/26 |
| 2002/0138392 A1 | 9/2002 | LeBlanc | |
| 2002/0152152 A1 * | 10/2002 | Abdelnur et al. ............... | 705/37 |
| 2002/0152153 A1 | 10/2002 | Nakagawa | |
| 2002/0174023 A1 * | 11/2002 | Grey et al. ....................... | 705/26 |
| 2002/0178104 A1 * | 11/2002 | Hausman ........................ | 705/37 |

(Continued)

FOREIGN PATENT DOCUMENTS

JP         2000339544         * 12/2000

(Continued)

OTHER PUBLICATIONS

The Dartnell Sales Manager's Handbook, Fourteenth Edition, John P. Steinbrink, Editor, 1989, pp. 412 and 512.*

(Continued)

*Primary Examiner* — Alexander Kalinowski
*Assistant Examiner* — Ann Loftus
(74) *Attorney, Agent, or Firm* — Rothwell, Figg, Ernst & Manbeck, P.C.

(57) ABSTRACT

An auto-trading strategy for executing an order to buy or sell a specified quantity of a certain item. The strategy utilizes urgency scores rather than time bins. In one embodiment, an urgency score is determined at a certain point in time. The urgency score is a function of a trading target associated with the point in time and the actual number of items that have been traded as of the certain point in time.

30 Claims, 7 Drawing Sheets

U.S. PATENT DOCUMENTS

| | | |
|---|---|---|
| 2002/0194051 A1* | 12/2002 | Hall et al. ............. 705/10 |
| 2003/0004750 A1* | 1/2003 | Teraoka et al. .......... 705/1 |
| 2003/0050879 A1* | 3/2003 | Rosen et al. ........... 705/35 |
| 2003/0065608 A1* | 4/2003 | Cutler ................. 705/37 |
| 2003/0233306 A1* | 12/2003 | Madhavan et al. ....... 705/37 |
| 2003/0236737 A1 | 12/2003 | Kemp, II et al. |
| 2004/0006504 A1* | 1/2004 | Mariamova et al. ...... 705/10 |
| 2004/0068459 A1* | 4/2004 | Goulet et al. ........... 705/37 |
| 2004/0093300 A1 | 5/2004 | Burns |
| 2004/0143538 A1* | 7/2004 | Korhammer et al. ...... 705/37 |
| 2004/0177024 A1 | 9/2004 | Bok et al. |
| 2004/0236663 A1 | 11/2004 | Backestrand et al. |
| 2004/0254874 A1 | 12/2004 | Bok et al. |

FOREIGN PATENT DOCUMENTS

| | | | |
|---|---|---|---|
| JP | 2002024586 | * | 1/2002 |
| JP | 2005018287 | * | 1/2005 |
| TW | 200602926 | * | 1/2006 |

OTHER PUBLICATIONS

Weber, Lewis, The Cumulative Record as a Management Tool, Behavioral Technology Today, Issue 2, 2002, pp. 1-8.*

* cited by examiner

SYSTEM, METHOD, AND COMPUTER PROGRAM PRODUCT FOR EXECUTING A BUY OR SELL ORDER

BACKGROUND OF THE INVENTION

1. Field of the Invention

This invention relates generally to buying or selling commodities in a market, and, more specifically, to a system, method, and computer program product for executing an order to buy or sell a specified number of units of a certain item (e.g., 100,000 shares of a corporation's stock or other financial instrument).

2. Discussion of the Background

Two basic types of orders are the market order and the limit order. Market orders allow an investor to choose the timing of the order execution. The drawback of a market order is that the investor loses control over execution price and usually overpays. A limit order is more likely to result in good executions, but does not allow the investor to control the timing of execution. This is a problem, particularly when the investor is trying to follow a pre-specified trading distribution.

Several auto-trading strategies have been developed to solve or lessen the impact of this problem. One family of such strategies is referred to as a "bin-based" strategy (it is also referred to as a "time-slicing" strategy). A bin-based strategy subdivides a continuous trading period (usually a day) into bins of fixed length (e.g., 30 minutes), assigns a number of items to each bin, and then uses simple rules to trade (i.e., buy or sell) within each bin.

Certain problems exist with bin-based strategies. The bin based approach forces unnecessary structure on the trading process. For example, as the end of a bin approaches, the strategy may need to rely on aggressive orders, which may result in poor executions. Other disadvantages exist.

SUMMARY OF THE INVENTION

The above described and other disadvantages are addressed by the present invention. The present invention provides a method for executing an order to buy or sell a specified quantity of a certain item and provides a system and computer program product for implementing the method. Rather than employing time bins, the method relies on continuous evaluation of the progress of the trade (in terms of how much of the trade has been completed by the current point in time), and the subsequent calculation of an urgency score based on a comparison of this progress level to a specific target level for the current time.

According to one embodiment of the invention, an auto-trading method for buying or selling a specified quantity of a certain item (e.g., 10,000 shares of a certain stock) includes the following steps: (1) placing zero or more tranche orders for the item, wherein each tranche order specifies, at the least, a target price and a quantity (the target price can be a limit price or the current market price—that is, the order can be a "limit order" or a "market order"); (2) waiting a certain period of time (e.g., 1 minute); (3) determining the total number of units of the item that have been executed (successfully filled) between when the process began and the current moment in time; (4) determining an urgency score, wherein the urgency score is based, at least in part, on the total number of units of the item that have been traded between when the process began and the current moment in time; (5) placing zero or more additional tranche orders for the item, wherein each additional tranche order, if there are any, specifies a target price and a quantity, wherein the target price and/or the quantity is based, at least in part, on the determined urgency score; and (6) if necessary, proceeding back to step (2).

Advantageously, according to one embodiment of the present invention, the urgency score determines whether any of the additional tranche orders is a market order. For example, if the urgency score is sufficiently high, then at least one of the one or more additional tranche orders will be a market order. A market order is an order where the target price is set to the current market price so as to assure that it will be filled very quickly.

In one embodiment, a continuous or discrete set of trading targets are used in determining the urgency score. A trading target is a target value that is associated with a particular point in time. A target value corresponds to a certain amount of the items that are desired to be traded. The following is an example trading target: [Target Value=100, Time=$T_1$]. This example trading target indicates that it is desired to have 100 shares of the stock traded by time $T_1$. Target values also may be expressed in terms of percentages. For example, a trading target may be expressed as [Target Value=75%, Time=$T_2$]. This example trading target indicates that it is desired to have 75% of the total desired trade completed by time $T_2$.

According to one embodiment of the invention, a method for determining an urgency score includes the following steps: (1) specifying a set of target values, wherein each target value in the set is associated with a point in time; (2) at or about a point in time that is associated with a target value, determining the number of items that have been traded; (3) determining the difference between the number determined in step (2) and the target value associated with the point in time; and (4) determining the urgency score based, at least in part, on the difference determined in step (3).

According to another embodiment of the invention, a method for determining an urgency score includes the following steps: (1) associating a target value, a bottom threshold value, and a top threshold value with a point in time, wherein the bottom threshold value is less than or equal to the target value and the top threshold value is greater than or equal to the corresponding target value; (2) at or about the point in time, determining the number of items that have been traded; (3) determining whether the number of items that have been traded is greater than or less than the target value; (4) if the number is greater than the target value, then compare the number to the top threshold; (5) if the number is less than the target value, then compare the number to the bottom threshold; and (6) based on the results of the comparison performed in step (4) or step (5), determine the urgency score.

The above and other features and advantages of the present invention, as well as the structure and operation of preferred embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

While the present invention may be embodied in many different forms, there is described herein in detail an illustrative embodiment(s) with the understanding that the present disclosure is to be considered as an example of the principles of the invention and is not intended to limit the invention to the illustrated embodiment(s).

As discussed above, the present invention provides a method for executing an order to buy or sell a specified quantity of a certain item and a system and computer program product for implementing the method. The invention can apply to the trading (i.e., buying or selling) of any item, but, for the sake of brevity, the invention is described below using the example of selling a certain number of shares of a stock.

Figure 1:
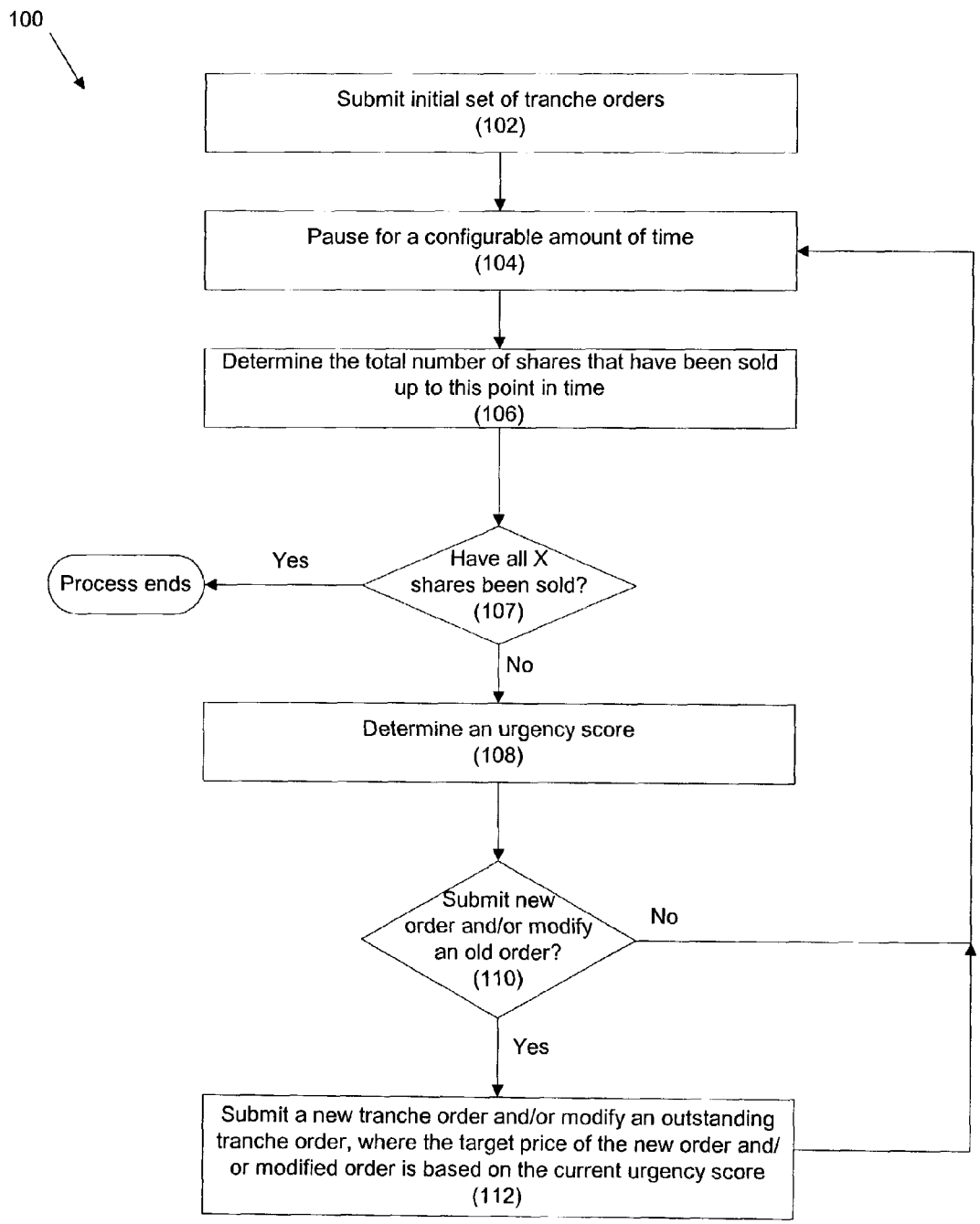
FIG. 1 is flow chart illustrating a process, according to one embodiment of the invention, for executing an order to sell a certain number of shares of a stock.

FIG. 1 is flow chart illustrating a process 100, according to one embodiment of the invention, for executing an order to sell X number of shares of a stock. Process 100 may begin in step 102, where an initial set of tranche orders to sell Y number of shares of the stock is submitted, where Y is less than or equal to X. Preferably, Y is sufficiently small so that the tranche orders will not have a significant market impact. The initial set of tranche orders may consist of a single tranche order or two or more tranche orders. Some or all of the tranche orders may be submitted for execution to a trading system, such as POSIT® or another trading system. If the stock is traded on an exchange (e.g., the New York Stock Exchange), then some or all of the tranche orders may also be submitted for execution to that exchange.

Tranche orders may be generated with any order type or order attribute that is admissible on the markets, exchanges, and trading systems to which the tranche orders are sent. Two common order types that are referred to in this application are limit orders and market orders. A limit order specifies both a quantity and a limit price. More specifically, a limit order is an order to buy or sell the specified quantity of a security at the limit price. A buy limit order can only be executed at the limit price or lower, and a sell limit order can only be executed at the limit price or higher.

In step 104, the process pauses for a certain amount of time (e.g., 1 minute). In step 106, the status of every tranche order that has been submitted since the process began is determined. For example, the total number of shares that have been sold between when the process began and the current moment in time may be determined.

In step 107, it is determined whether all of the X shares have been sold. If so, the process ends, otherwise the process continues to step 108.

In step 108, an urgency score is determined. The urgency score is based, at least in part, on the determined status of the various tranche orders. For example, the urgency score may be a function of, at least, the total number of shares that have been sold between when the process began and the current moment in time.

After determining the urgency score, a determination is made as to whether one or more new sell tranche orders should be submitted and/or whether one or more outstanding tranche orders should have their target price (and/or other attributes) modified (step 110).

In one embodiment, the determination of whether to submit new tranche orders is a function of, at least, the urgency score. In a preferred embodiment, this determination is a function of, at least, the urgency score and a configurable lumpiness constraint. The lumpiness constraint is a constraint that specifies a minimum order size. The lumpiness constraint may be configurable using a parameter. In one embodiment, when this parameter is set to a large value, the strategy will generate fewer tranche orders but each order will be larger, and if the parameter is set to a small value, the strategy will generate a large number of smaller-sized tranche orders.

In one embodiment, the decision of whether to modify a tranche order may be based on how long the order has been pending and/or the distance between the tranche order price and the current market price. Preferably, the more stale an outstanding tranche order, the more likely it is to be modified.

If it is determined that no additional sell orders should be submitted and none of the outstanding tranche orders should be modified, then the process goes back to step 104, otherwise the process proceeds to step 112.

In step 112, at least one new tranche sell order is submitted and/or the price (and/or other characteristics) of at least one outstanding tranche order is modified. The price and/or quantity specified in the newly submitted tranche order is based, at least in part, on the urgency score. The price and/or quantity may also be based on the number of shares remaining to be sold. Similarly, the modification made to an outstanding tranche order's price is also based on the urgency score and/or the number of shares remaining to be sold. Additionally, if it is determined that a new tranche sell order should be submitted and an outstanding tranche order should be modified, then, preferably, the price of the outstanding tranche order is set to the price of the newly submitted tranche order.

In one embodiment, the price to the new tranche orders and/or modified tranche orders is determined using a pricing model. A pricing model takes a number of inputs (which may include (a) historical data, (b) real-time market data, (c) order characteristics such as tranche order size, and (d) urgency parameters such as desired probability of fill or desired order life-span) and then returns a suggested price. The urgency parameter inputs to the pricing model can be linked to the urgency score calculated in step 108. This means that the suggested price will be more passive (i.e. placed further from the current market price) for lower calculated urgency levels and more aggressive for higher calculated urgency levels.

After step 112, the process returns to step 104.

Figure 2:
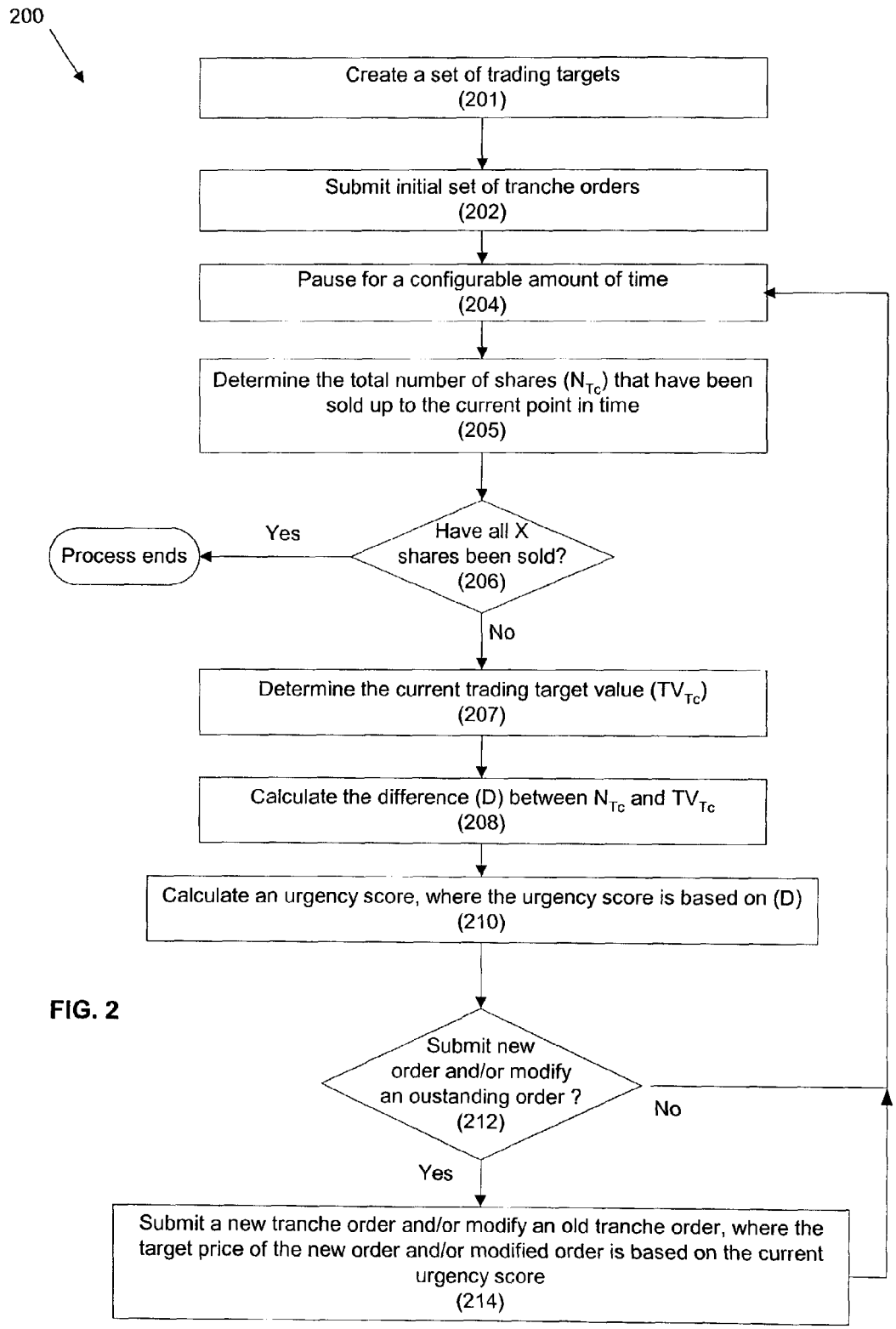
FIG. 2 is a flow chart illustrating a process, according to another embodiment, for executing an order to sell a certain number of shares of a stock.

FIG. 2 is a flow chart illustrating a process 200, according to another embodiment, for executing an order to sell X number of shares of a stock. In this embodiment, the urgency scores are a function of the total number of the shares that have been traded and, at the least, a set of trading targets.

A trading target is a trading value that is associated with a particular point in time. The trading value corresponds to a certain number of the total number of shares that are desired to be sold. Thus, at a minimum, a trading target specifies both an amount of the shares and a corresponding point in time. The following is an example trading target: [Trading value=100, Time=$T_1$]. This example trading target indicates that a goal is to have 100 of the X number of shares traded by time $T_1$. $T_1$ may be an absolute time (e.g., 2:15 PM EST) or a relative time (e.g., N seconds after a certain event, where $N \geq 0$). Target values may also be expressed in terms of percentages. For example, a trading target may be expressed as [Trading value=75%, Time=$T_2$]. This example trading target indicates that by time $T_2$ the goal is to have traded 75% of the X number shares.

Figure 3:
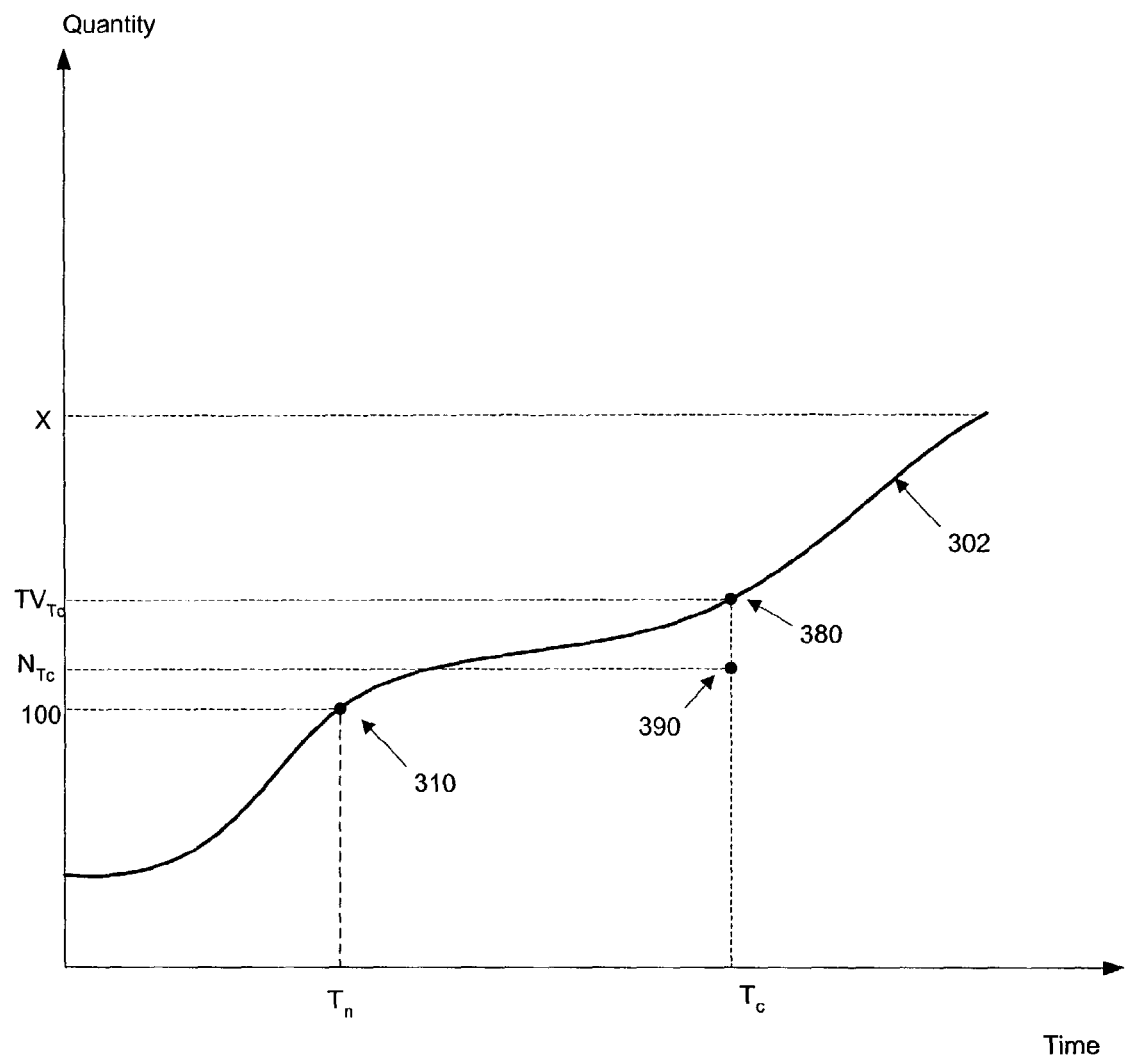
FIG. 3 shows a graphical representation of a continuous set of trading targets.

The set of trading targets upon which the urgency scores depend may be a continuous set or a discrete set. FIG. 3 shows a graphical representation of a continuous set of trading targets. The X axis of the graph represents time and the Y axis of the graph represents share quantity. The continuous set of trading targets is represented by line 302. Each point on line 302 is a trading target. That is, each point on line 302 is associated with a certain number of shares and a certain point in time. For example, trading target 310 is associated with a certain quantity of shares (i.e., 100 shares) and a certain point in time (i.e., $T_n$).

Referring now to FIG. 2, the process 200 for executing an order to sell X number of shares of a stock will be described. In step 201 a set of trading targets is created or acquired. The set can be continuous or discrete. After step 201, process 200 proceeds to step 202.

In step 202, an initial set of tranche orders to sell Y number of shares of the stock is submitted, where Y is less than or equal to X. In step 204, the process pauses for a certain amount of time (e.g., 1 minute). In step 205, the total number of shares ($N_{Tc}$) that have been sold between when the process began and the current moment in time ($T_c$) is determined. This number of shares is represented by point 390 on FIG. 3.

In step 206, it is determined whether $N_{Tc}$=X (i.e., it is determined whether all of the X shares have been sold). If so, the process ends, otherwise the process continues to step 207.

In step 207, the trading target associated with the current moment in time ($T_c$) is determined. This is shown as point 380 in FIG. 3. In step 208, the distance from point 390 to trading target 380, which is the trading target associated with time $T_c$, is determined. That is, the difference (D) between $N_{Tc}$ and $TV_{Tc}$ ($TV_{Tc}$ is the trading value associated with trading target 380) is determined.

In step 210, the urgency score is calculated. The urgency score (U) is a function of D (i.e., U=f(D)). In one embodiment, U=D.

After step 210, process 200 proceeds to step 212. Steps 212-214 are identical to steps 110-112.

Figure 4A:
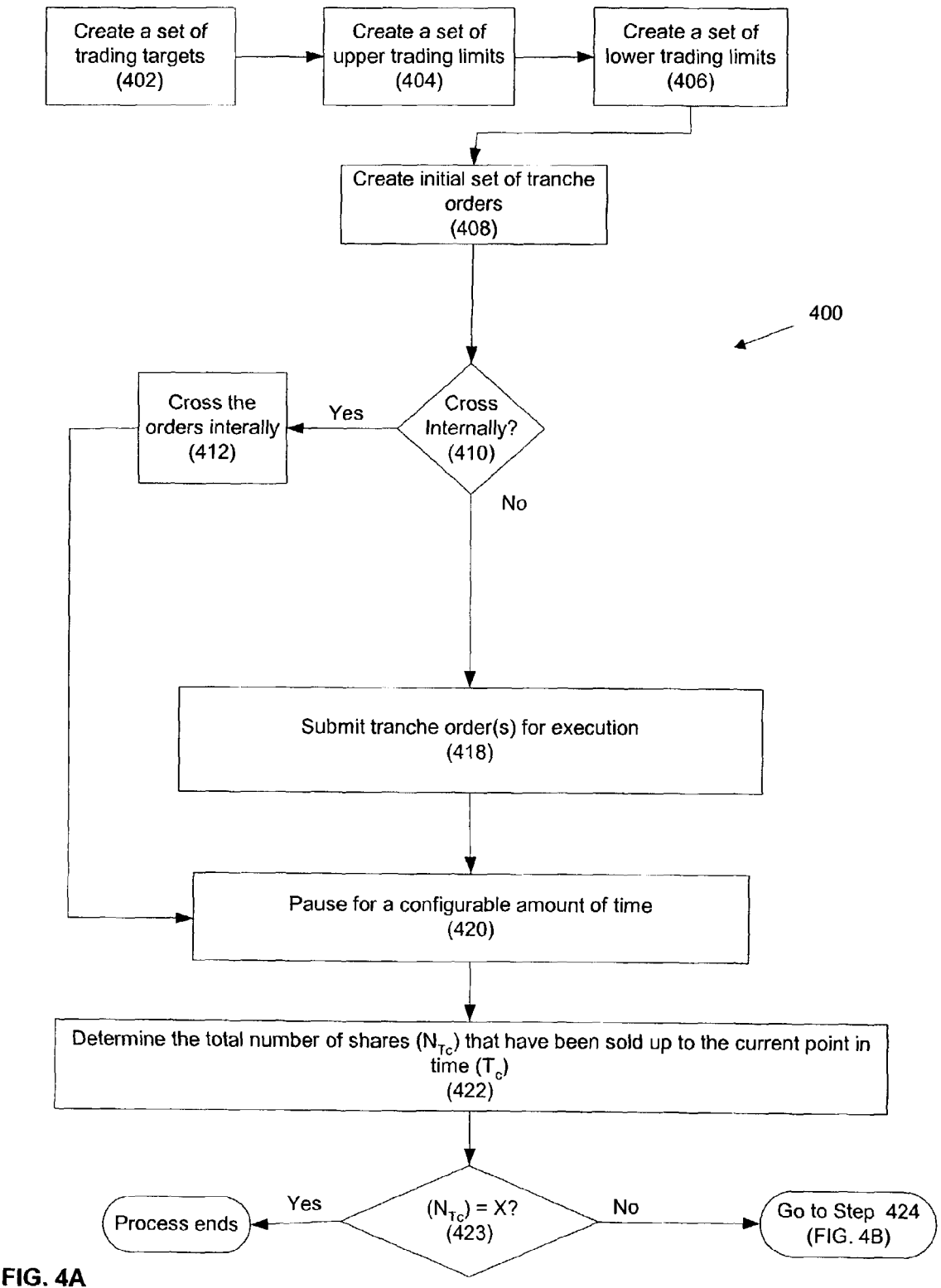
FIGS. 4A,B show a flow chart illustrating a process, according to another embodiment, for executing an order to sell a certain number of shares of a stock.

FIGS. 4A,B show a flow chart illustrating a process 400, according to another embodiment, for executing an order to sell X number of shares of company ABC's stock. In this embodiment, an urgency score is a function of the total number of the shares that have been traded, a trading target, an upper trading limit, and a lower trading limit.

Process 400 begins in step 402, where a set of trading targets are specified. In step 404, a set of upper trading limits are specified. Each upper trading limit in the set specifies a certain number of shares and a certain point in time. In step 406, a set of lower trading limits are specified. Each lower trading limit in the set specifies a certain number of shares and a certain point in time.

Figure 5:
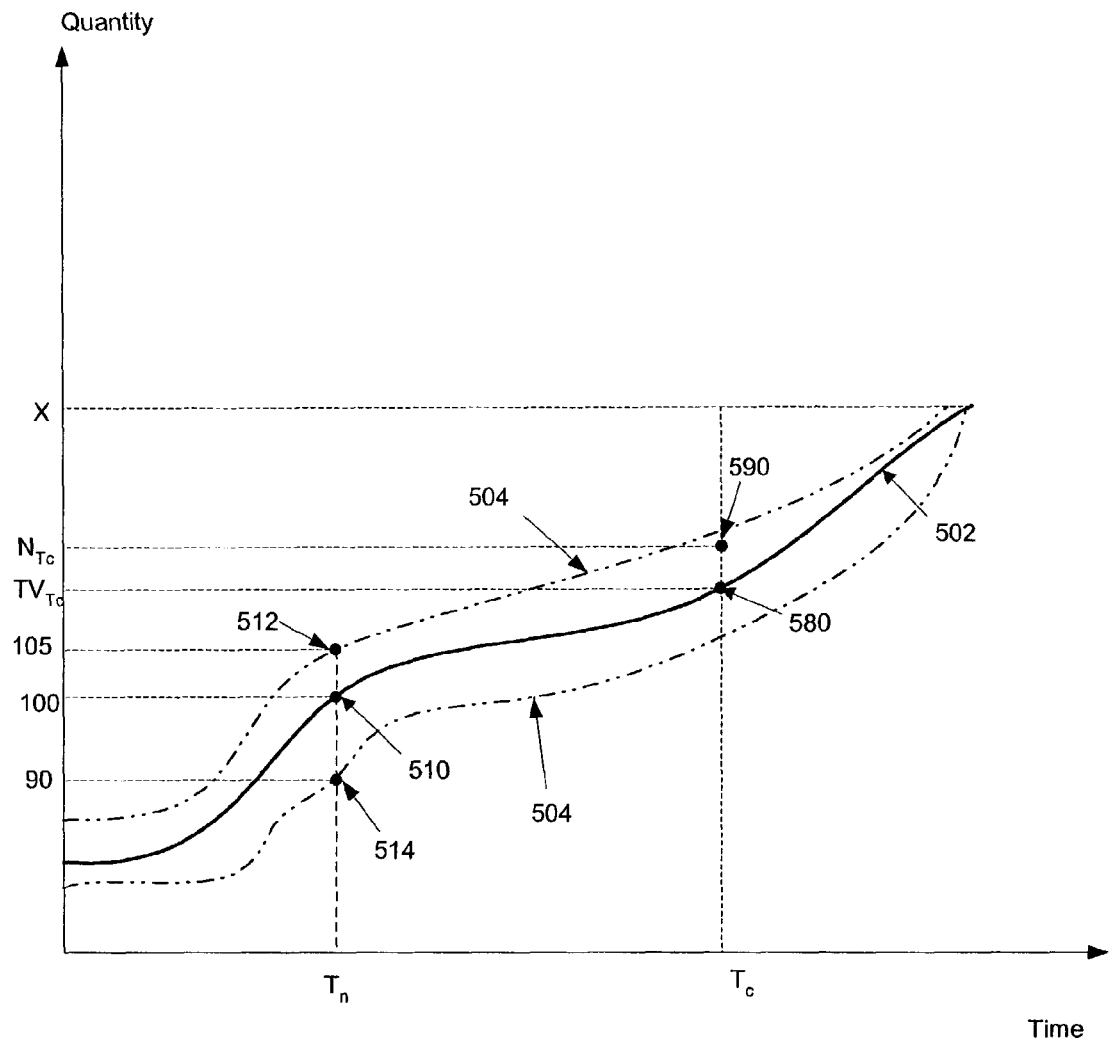
FIG. 5 is a graph that illustrates a continuous set of trading targets, a continuous set of lower trading limits, and a continuous set of upper trading limits.

FIG. 5 is a graph that illustrates a continuous set of trading targets 502, a continuous set of lower trading limits 504, and a continuous set of upper trading limits 506. The X axis of the graph represents time and the Y axis of the graph represents quantity. Preferably, for each trading target there is a corresponding upper trading limit and lower trading limit, where the number of shares associated with the upper limit is greater than or equal to the number of shares associated with the trading target and the number of shares associated with lower limit is less than or equal to the number of shares associated with trading target. For example, trading target 510 specifies 100 shares, upper trading limit 512 specifies 105 shares, and lower trading limit 514 specifies 90 shares.

Referring back to FIG. 4A, in step 408, an initial set of one or more tranche orders to sell a certain number (Y) of the X shares is created. In step 410, it is determined whether any of the tranche orders can be matched internally. If the entity that performs process 400 performs the process for many users, then there is a certain likelihood that at or about the same time that the set of tranche orders is created one or more corresponding orders to buy shares of company ABC may exist. In this situation, there is an opportunity to cross orders internally, which is advantageous because the orders do not have to be submitted to a trading system or an exchange for execution. Thus, if it is determined that a tranche order can be crossed internally, then the tranche order is crossed internally (step 412), otherwise the process proceeds to step 418. Preferably, when crossing tranche orders internally, the appropriate upper limit is not violated.

In step 418, the set of tranche order is submitted for execution to trading system, an exchange, or the like.

In step 420, the process pauses for a certain period of time (e.g., 1 minute). In step 422, the total number of shares ($N_{Tc}$) that have been sold between when the process began and the current moment in time ($T_c$) is determined. This number of shares is represented by point 590 in FIG. 5.

In step 423, it is determined whether $N_{Tc}$=X (i.e., it is determined whether all of the X shares have been sold). If so, the process ends, otherwise the process continues to step 424.

In step 424, it is determined whether the total number of shares determined in step 422 is greater than the trading target value ($TV_{Tc}$) associated with time $T_c$ (this target value is corresponds to point 580 on line 502, see FIG. 5). If the number $N_{Tc}$ is greater than the trading target value $TV_{Tc}$, then the number $N_{Tc}$ is compared to $UL_{Tc}$ (the upper trading limit associated with time $T_c$) (step 426), otherwise the number $N_{Tc}$ is compared to $LL_{Tc}$ (the lower trading limit associated with time $T_c$) (step 428). In step 430, the urgency score is determined based on the results of the comparison performed in step 426 or step 428. For example, in one embodiment, when $N_{Tc}$ is above the lower trading limit, the urgency score is inversely proportional to the difference between $N_{Tc}$ and the lower trading limit, and, when $N_{Tc}$ is below the lower trading limit, the urgency score is at its maximum.

After determining the urgency score, a determination is made as to whether one or more new tranche orders should be submitted and/or whether one or more outstanding tranche orders should have their target price and/or other characteristic modified (step 432). Step 432 is equivalent to step 110 of process 100.

If it is determined that no additional tranche orders should be submitted and none of the outstanding orders should be modified, then the process goes back to step 420, otherwise the process proceeds to step 434.

In step 434, at least one new sell tranche order is created and/or the target price of at least one outstanding order is modified. Step 434 is equivalent to step 112 of process 100. After step 434, the process returns to step 410.

Figure 4B:
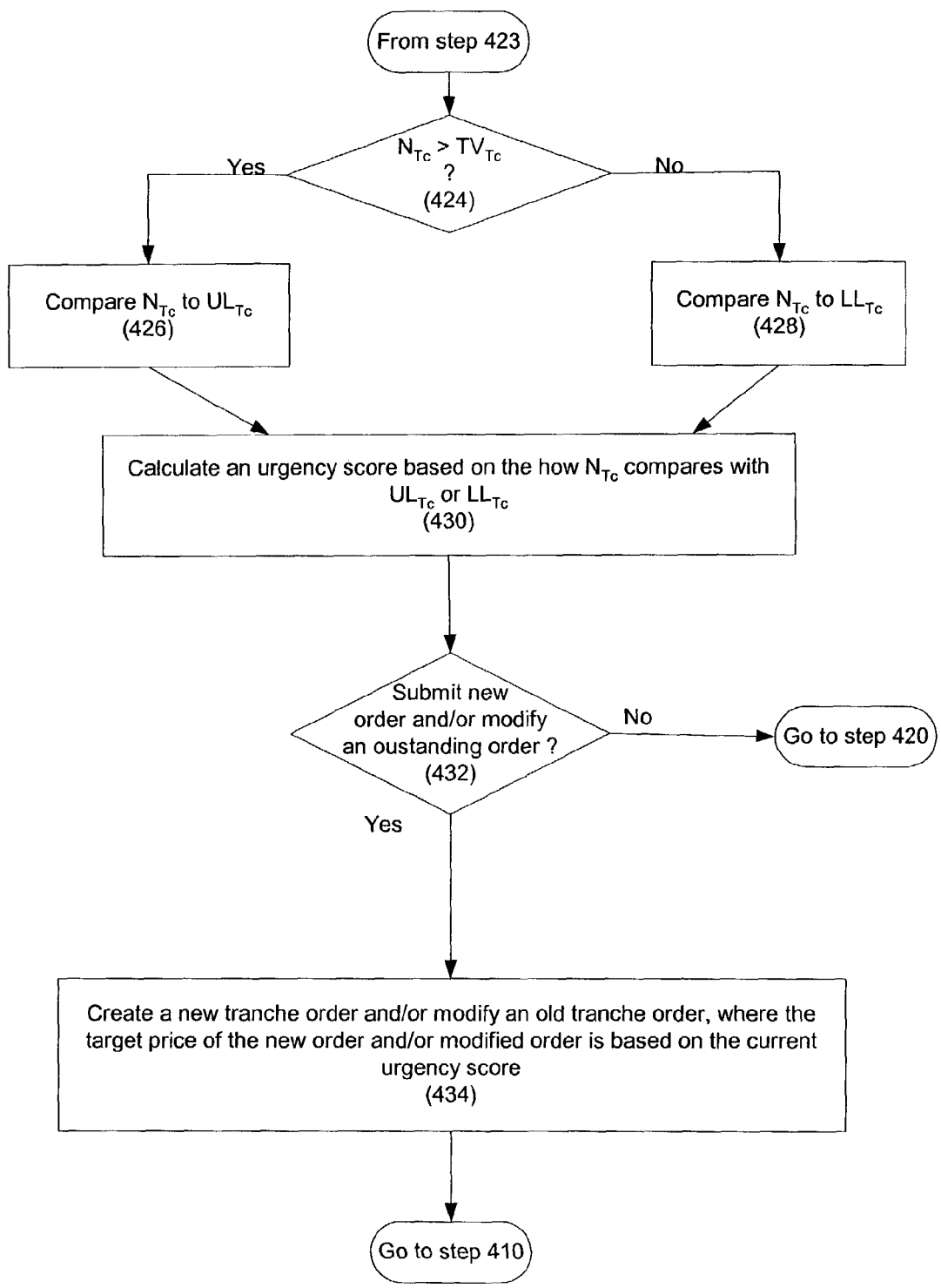

Although processes 100, 200 and 400 are illustrated as an ordered series of steps in FIGS. 1, 2 and 4, respectively, the processes need not be performed in the order shown. Moreover, steps may be added and/or deleted from the processes without departing from the inventive concepts. For example, and without limitation, the step of determining an urgency score may be the first or one of the first steps performed.

Figure 6:
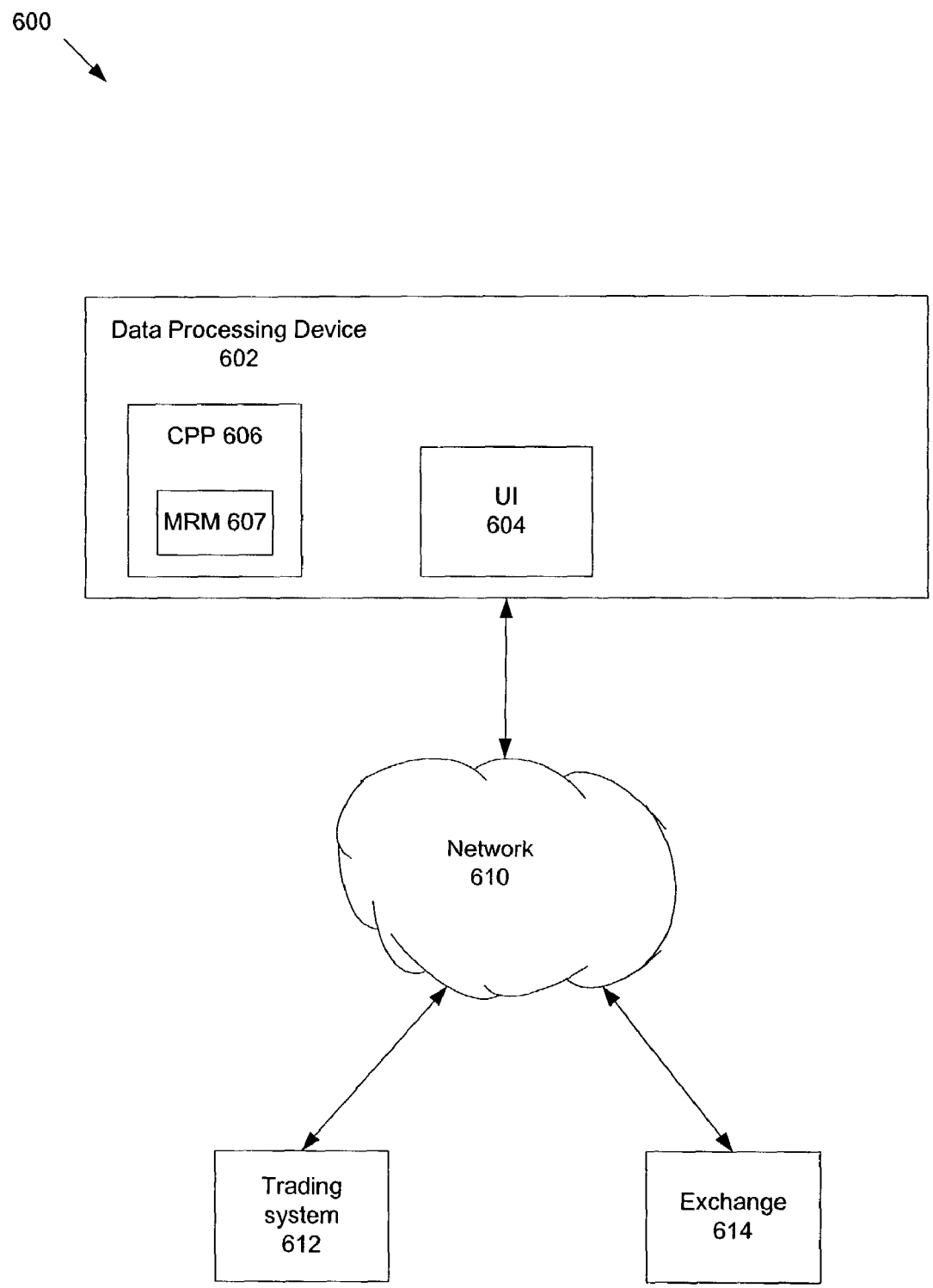
FIG. 6 is a functional block diagram of a system according to one embodiment of the invention.

FIG. 6 is a functional block diagram of a system 600 according to one embodiment of the invention. System 600 includes a data processing device 602 (e.g., a general purpose computer, a special purpose computer, or other data processing device). Data processing device 602 may include a user interface 604 for receiving from a user or from another system (not shown) an order to trade X number of shares of a particular stock. Data processing device 602 also may include a computer program product 606 that includes a machine-readable medium 607 having instructions (not shown) stored thereon. The instructions may be used to program a data processing device 602 to perform the processes described above. The machine-readable medium may include, but is not limited to, floppy diskettes, optical disks, CD-ROMS, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Preferably, data processing device 602 is connected to at least one network 610 so that device 602 can submit buy/sell orders to a trading system 612 or exchange 614.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A computerized method for selling X shares of a stock, where X is a number greater than zero, comprising:
   via a computer in data communications with an electronic market place, electronically submitting to the electronic market place, an initial set of tranche orders to sell Y shares of the stock, wherein Y is a number less than or equal to X;
   via said computer, calculating a total number of shares from the initial set of tranche orders that have been sold at a selected point in time;
   employing a set of trading targets [Trading Value=$x_t$, Time=t], wherein $0<x_t<X$ for a plurality of time values t;
   via said computer, calculating an urgency score, wherein the urgency score is based, at least in part, on said determined total number of shares sold at said selected point in time compared to X, and is also a function of a TradingValue associated with said selected point in time; and
   via said computer, creating and electronically submitting to the electronic market place, at least one new tranche order specifying a quantity and a target price, or modifying an existing tranche order from said initial set of tranche orders, wherein the target price or modification is determined based, at least in part, on the urgency score.

2. The method of claim 1, further comprising determining the difference between said total number of shares sold and said TradingValue.

3. The method of claim 2, wherein said urgency score is also a function of said difference between said total number of shares sold and said TradingValue.

4. The method of claim 1, wherein the target price is determined using a limit order pricing algorithm, wherein at least one of the inputs to the limit order pricing algorithm is a function of, at the least, the urgency score.

5. The method of claim 1, further comprising:
   employing a set of lower trading limits, each lower trading limit being associated with a different one of the trading targets; and
   via said computer, determining whether said total number of shares sold is greater than a trading target value associated with said one of the trading targets, wherein if said total number of shares sold is less than said trading target value, then the urgency score is also a function of the lower trading limit associated with said one of the trading targets.

6. The method of claim 5, further comprising employing a set of upper trading limits, each upper trading limit being associated with a different one of the trading targets, wherein if said total number of shares sold is greater than said trading target value, then the urgency score is a function of, at the least, the upper trading limit associated with said one of the trading targets.

7. The method of claim 1, wherein the target price is the current market price so that the at least one new tranche order is a market order.

8. A system for selling X shares of a stock, where X is a number greater than zero, comprising:
   means for submitting an initial set of tranche orders to sell Y shares of the stock, wherein Y is a number less than or equal to X;
   means for determining a total number of shares from the initial set of tranche orders that have been sold at a selected point in time;
   means for employing a set of trading targets [TradingValue=$x_t$,Time=t], wherein $0<x_t<X$ for a plurality of time values t;
   means for determining an urgency score based, at least in part, on said total number of shares sold at said selected point in time compared to X and as function of a TradingValue associated with said selected point in time; and
   means for creating at least one new tranche order specifying a quantity and a target price, or means for modifying an existing tranche order from said initial set of tranche orders, wherein the target price or modification is determined based, at least in part, on the urgency score.

9. The system of claim 8, further comprising means for determining the difference between said total number of shares sold and said TradingValue.

10. The system of claim 9, wherein said urgency score is also a function of said difference between said total number of shares sold and said TradingValue.

11. The system of claim 8, wherein the target price is determined using a limit order pricing algorithm, wherein at least one of the inputs to the limit order pricing algorithm is a function of at the least, the urgency score.

12. The system of claim 8, further comprising:
   a set of lower trading limits, each lower trading limit being associated with a different one of the trading targets;
   means for determining whether said total number of shares sold is greater than a trading target value associated with said one of the trading targets, wherein
   if said total number of shares sold is less than said trading target value, then the urgency score is also a function of the lower trading limit associated with said one of the trading targets.

13. The system of claim 12, further comprising a set of upper trading limits, each upper trading limit being associated with a different one of the trading targets, wherein if said total number of shares sold is greater than said trading target value, then the urgency score is also a function of the upper trading limit associated with said one of the trading targets.

14. The system of claim 8, wherein the target price is the current market price so that the at least one new tranche order is a market order.

15. A computer program product stored on a computer readable medium including computer executable instructions for selling X shares of a stock, where X is a number greater than zero, by performing operations comprising:
submitting an initial set of tranche orders to sell Y shares of the stock, wherein Y is less than or equal to X;
determining a total number of shares from the initial set of tranche orders that have been sold at a selected point in time;
acquiring a set of trading targets [TradingVaue=$x_t$, Time=t], wherein $0<x_t<X$ for a plurality of time values t;
determining an urgency score, wherein the urgency score is based, at least in part, on said total number of shares sold at said selected point in time compared to X, wherein the urgency score is also a function of a TradingValue associated with said selected point in time; and
creating at least one new tranche order specifying a quantity and a target price, or instructions for modifying an existing tranche order from said initial set of tranche orders, wherein the target price or modification is determined based, at least in part, on the urgency score.

16. The computer program product of claim 15, wherein the instructions further comprise instructions for determining the difference between said total number of shares sold and said TradingValue.

17. The computer program product of claim 16, wherein said urgency score is also a function of said difference between said total number of shares sold and said TradingValue.

18. The computer program product of claim 15, wherein the target price is determined using a limit order pricing algorithm, wherein at least one of the inputs to the limit order pricing algorithm is a function of, at the least, the urgency score.

19. The computer program product of claim 15, the instructions further comprising:
instructions for acquiring a set of lower trading limits, each lower trading limit being associated with a different one of trading targets; and
instructions for determining whether said total number of shares sold is greater than a trading target value associated with said one of the trading targets, wherein
if said total number of shares sold is less than said trading target value, then the urgency score is also a function of the lower trading limit associated with said one of the trading targets.

20. The computer program product of claim 19, wherein the instructions further comprise instructions for acquiring a set of upper trading limits, each upper trading limit being associated with a different one of the trading targets, wherein if said total number of shares sold is greater than said trading target value, then the urgency score is also a function of the upper trading limit associated with said one of the trading targets.

21. The computer program product of claim 15, wherein the target price is the current market price so that the at least one new tranche order is a market order.

22. The computerized method of claim 1, wherein if a determination is made to submit said at least one new tranche order, said quantity is determined in accordance with a lumpiness constraint.

23. The system of claim 8, wherein if a determination is made to submit said at least one new tranche order, said quantity is determined in accordance with a lumpiness constraint.

24. The computer program of claim 15, wherein if a determination is made to submit said at least one new tranche order, said quantity is determined in accordance with a lumpiness constraint.

25. The computerized method of claim 1, wherein the set of trading targets is a continuous set.

26. The computerized method of claim 1, wherein the set of trading targets is a discrete set.

27. The computerized method of claim 8, wherein the set of trading targets is a continuous set.

28. The computerized method of claim 8, wherein the set of trading targets is a discrete set.

29. The computerized method of claim 15, wherein the set of trading targets is a continuous set.

30. The computerized method of claim 15, wherein the set of trading targets is a discrete set.

* * * * *

UNITED STATES PATENT AND TRADEMARK OFFICE
CERTIFICATE OF CORRECTION

| | | |
|---|---|---|
| PATENT NO. | : 8,306,900 B2 | Page 1 of 1 |
| APPLICATION NO. | : 10/457479 | |
| DATED | : November 6, 2012 | |
| INVENTOR(S) | : Bok et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1889 days.

Signed and Sealed this
Eleventh Day of November, 2014

Michelle K. Lee
*Deputy Director of the United States Patent and Trademark Office*